United States Patent

[11] 3,568,785

[72] Inventor Walter S. Gray
 Kansas City, Kans.
[21] Appl. No. 800,922
[22] Filed Feb. 20, 1969
[45] Patented Mar. 9, 1971
[73] Assignee Gray Brothers, Inc.
 Kansas City, Kans.

[54] MOTORIZED DOLLY
 5 Claims, 11 Drawing Figs.
[52] U.S. Cl. .................................................. 180/2,
 180/20, 180/65, 280/404
[51] Int. Cl. ....................................................... B60l 9/00
[50] Field of Search ......................................... 180/2, 20,
 65, 9.62; 280/404, 79.1; 214/1 (D), 3

[56] References Cited
UNITED STATES PATENTS
1,812,085 6/1931 Davis ........................... 180/2(UX)

| | | | |
|---|---|---|---|
| 3,070,386 | 12/1962 | Gregg ........................... | 280/404 |
| 3,112,037 | 11/1963 | Thiermann ................... | 214/3 |
| 3,187,830 | 6/1965 | Hilton .......................... | 180/20 |
| 3,398,806 | 8/1968 | Hendricks ................... | 180/2 |
| 3,074,499 | 1/1963 | Bertelsen ..................... | 180/9.62 |
| 3,361,224 | 1/1968 | McKim ......................... | 180/65 |
| 3,476,199 | 11/1969 | Kahn ............................ | 180/20 |

*Primary Examiner*—Leo Friaglia
*Attorney*—John A. Hamilton

ABSTRACT: A motorized dolly consisting of a low platform supported by a pair of drum-type ground-engaging wheels, an electric motor disposed entirely beneath said platform so as to leave the top of said platform planar and unobstructed, and operable to drive said wheels, remote control means for operating said motor, and brake means for inhibiting the turning of said wheels.

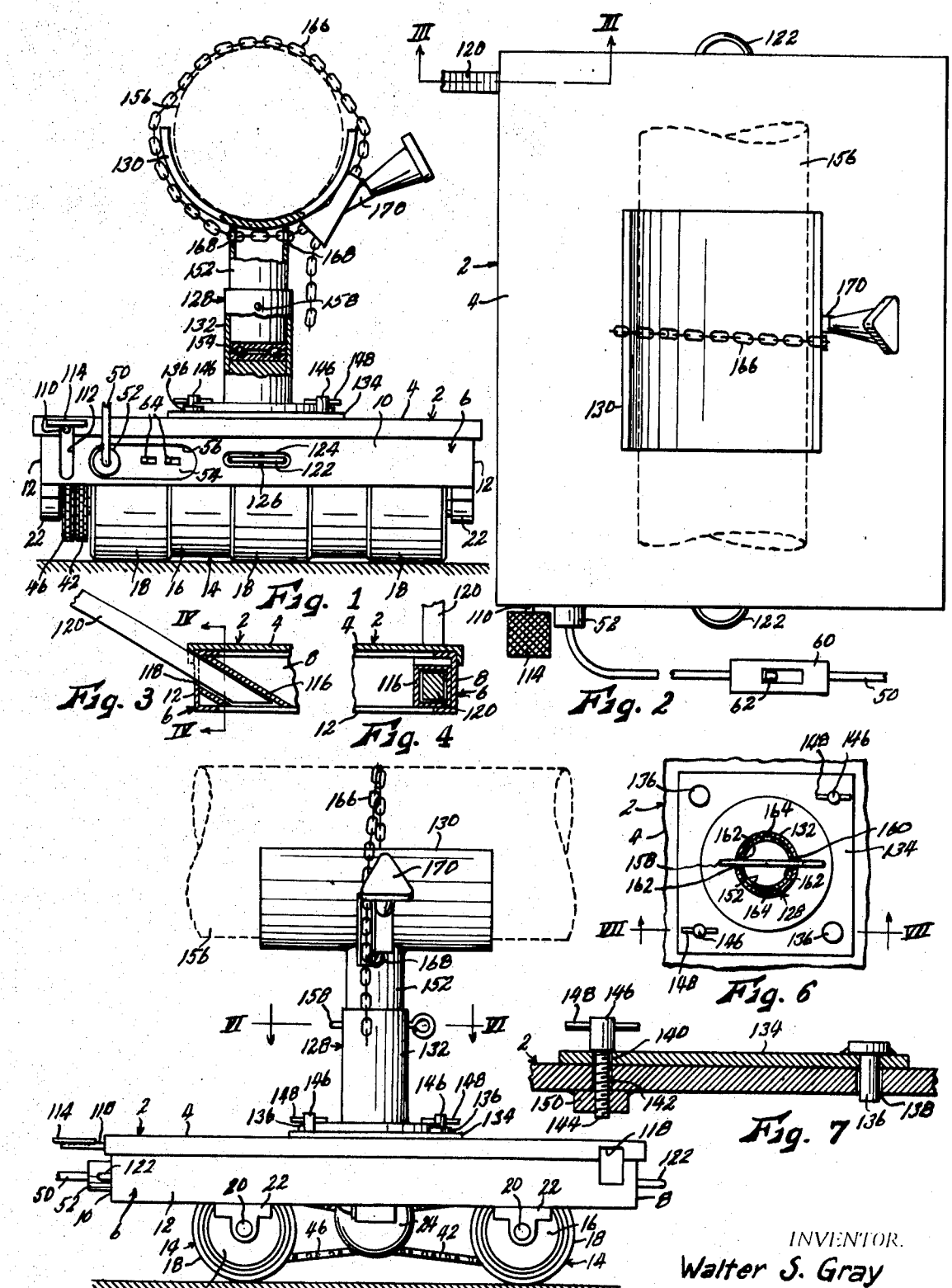

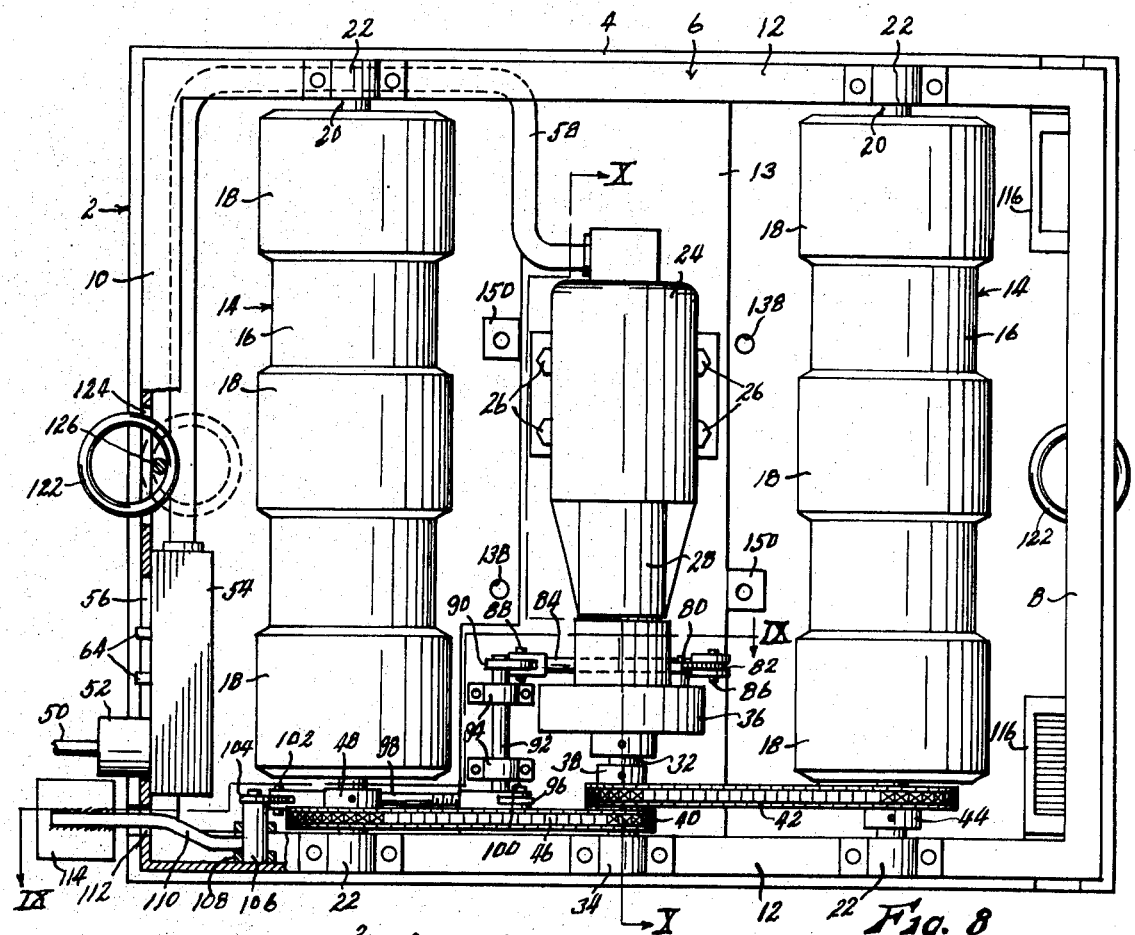
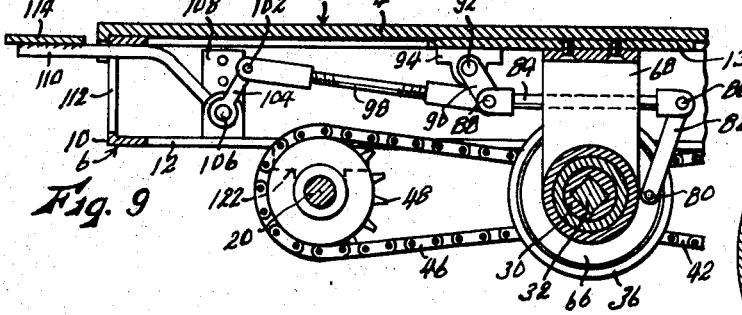
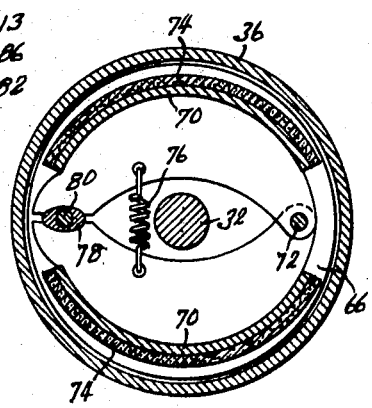
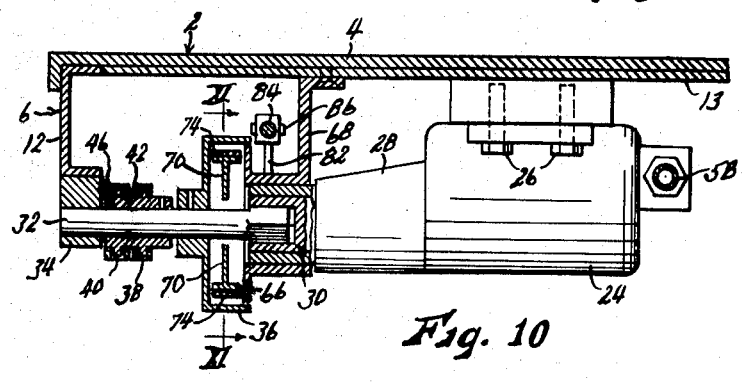
INVENTOR.
Walter S. Gray
BY John R. Hamilton
Attorney.

MOTORIZED DOLLY

This invention relates to new and useful improvements in dollies, which as a class include low, wheeled platforms for transporting heavy loads from place to place. The dolly forming the subject matter of the present invention has been developed particularly for carrying burial vaults, heavy electrical transformers, telephone poles and the like, but obviously has other and widely diversified usages.

Principal objects of the present invention are the provision of a dolly having an electric propulsion motor whereby to provide transportation for heavy objects without physical effort by the operator, the disposition of the motor and all other driving and control apparatus beneath the load platform, so as not to obstruct said platform or limit the horizontal dimensions of a load to be carried thereby, the provision of remote control means whereby the dolly may be operated by a person walking nearby, the provision of brakes operable to affect all wheels equally, the provision of novel steering means, and the provision of an upstanding column removably affixed to the platform for supporting specialized types of loads when desired.

Generally, these objects are accomplished by the provision of a dolly consisting of a low horizontal platform supported by a pair of axially elongated drum-type ground-engaging wheels, a motor beneath the platform for turning said wheels, said motor being supplied with electric current by a trailing cable in which control switches may be inserted, a brake positioned to affect both of said wheels equally, and a column releasably fixed at its lower end to said platform and having specialized load supporting and gripping means at its upper end.

Other objects are simplicity and economy of construction, and efficiency and dependability of operation.

With these objects in view, as well as other objects which will appear in the course of the specification, reference will be had to the accompanying drawing wherein:

FIG. 1 is a rear elevational view of a motorized dolly embodying the present invention, indicating a telephone pole mounted thereon for transportation, FIG. 2 is a top plan view of the dolly as shown in FIG. 1, FIG. 3 is a fragmentary sectional view taken on line III–III of FIG. 2, FIG. 4 is a fragmentary sectional view taken on line IV–IV of FIG. 3, FIG. 5 is a side elevational view of the dolly as shown in FIG. 1, FIG. 6 is a fragmentary sectional view taken on line VI–VI of FIG. 5, FIG. 7 is an enlarged fragmentary sectional view taken on line VII–VII of FIG. 6, FIG. 8 is an enlarged inverted plan view of the dolly, FIG. 9 is a fragmentary sectional view taken on line IX–IX of FIG. 8, FIG. 10 is a fragmentary sectional view taken on line X–X of FIG. 8, and FIG. 11 is an enlarged sectional view taken on line XI–XI of FIG. 10.

Like reference numerals apply to similar parts throughout the several views, and the numeral 2 applies to the platform of the dolly. Said platform is horizontal and rectangular, and consists of a plate 4 of heavy sheet metal having its edge portions bent downwardly around the periphery of a rectangular frame 6 formed of channel iron and including a front rail 8, rear rail 10, and side rails 12. Plate 4 is reinforced by a stiffener plate 13 extending transversely therebeneath midway between front rail 8 and rear rail 10, and affixed at its ends to side rails 12. Said platform is supported by a pair of ground-engaging wheels 14 carried beneath said platform on horizontal transverse axes, and disposed respectively adjacent the front and rear ends of the dolly. Each wheel 14 consists of a cylindrical drum 16 extending nearly the full width of the dolly and having a plurality of spaced apart treads 18 of rubber or the like permanently bonded thereto. Each wheel has an axle 20 fixed coaxially therein, the opposite ends of said axle being journaled in bearings 22 affixed to the lower edges of frame side rails 12.

Wheels 14 are driven by an electric motor 24 mounted on stiffener plate 13 beneath the platform by screws 26, midway between said wheels, the axis of said motor being horizontal and transverse to the dolly. As best shown in FIGS. 8–10, said motor operates through a geared speed reducer 28 to turn a drive shaft 30. The outer end of said drive shaft has formed therein a square socket in which is received the squared end of an extension shaft 32, the opposite end of said extension shaft being journaled in bearing 34 fixed to the lower edge of the adjacent frame side rail 12. Mounted fixedly on said extension shaft is a hollow brake drum 36 and a pair of sprocket wheels 38 and 40. Sprocket wheel 38 is operably connected by means of a sprocket chain 42 with a sprocket wheel 44 fixed on the axle 20 of forward wheel 14, and sprocket wheel 40 is operably connected by means of a sprocket chain 46 with a sprocket wheel 48 fixed on the axle 20 of rearward wheel 14. Since sprocket wheels 38 and 40 are of equal size and number of teeth, as are sprocket wheels 44 and 48, both of wheels 14 are turned at equal speeds by the operation of motor 24.

Electric current for motor 24 is furnished by a flexible electric cable 50 trailing from the dolly, and adapted to be connected to a suitable source of electric power. Said cable is provided at its dolly end with a connector 52 which may be plugged into a junction box 54 which is mounted at the inner side of rear frame rail 10, and is accessible through an opening 56 formed in said rail. Said junction box is connected to motor 24 by an electrical conduit 58 mounted in the platform. Interconnected in cable 50 at some distance from the dolly is a switch box 60 (see FIG. 2) carrying a manually operable on-off switch 62 for controlling the motor current. Additional control switches 64, for example to reverse the motor or to change the speed thereof, may be mounted in junction box 54 as shown (see FIGS. 1 and 8) or could if desired be mounted in switch box 60.

Referring to brake drum 36 fixed on extension shaft 32, it will be seen that the open end of said drum is closed by a fixed circular plate 66 carried by a bracket 68 fixed to stiffener plate 13 (see FIGS. 9–11). Within the drum, a pair of brakeshoes 70 are pivoted on a pin 72 fixed to plate 66 in parallel but offset relation from shaft 32. Each shoe is provided with a cylindrically curved facing 74 adapted by opposite pivotal movement of the shoes to be moved into frictional engagement with the drum, whereby to inhibit rotation of shaft 32. Said shoes are normally retracted out of engagement with the drum by a spring 76, but are operable to be expanded to engage the drum by a cam 78 (see FIG. 11) disposed between the free ends of the shoes and mounted fixedly on a shaft 80 rotatably mounted in plate 66 parallel to shaft 32. Thus whenever shaft 80 is turned in either direction, the cam forces shoes 70 into engagement with the brake drum. A crank 82 is fixed to shaft 80 externally of the brake drum. While any suitable linkage for oscillating said crank could be used, that shown consists of a link 84 pivoted at 86 to the free end of said crank and extending rearwardly therefrom, said link being pivoted at its rearward end, as at 88, to a crank 90 fixed to a transverse rocker shaft 92 journaled in bearings 94 affixed to stiffener plate 13, said rocker shaft having another crank 96 affixed thereto, an adjustable turnbuckle link 98 pivoted at 100 to crank 96 and extending rearwardly therefrom, the rearward end of link 98 being pivoted at 102 to a crank 104 affixed to a shaft 106 journaled in a bracket 108 affixed to the adjacent frame side rail 12, a lever 110 affixed to shaft 106 and extending rearwardly through a vertically elongated slot 112 formed in rear frame rail 10, and a treadle plate 114 affixed to the extended end of said lever. Thus, a downward pressure on treadle 114 by the operator's foot will apply the brakes. Also, since the braking force is applied to extension shaft 32, which is common to the drive of both of wheels 14, both wheels will be braked equally.

At the forward end of the dolly, at each side thereof, a downwardly and inwardly inclined tube 116 is affixed to the inner side of front frame rail 8. Each tube opens through an opening 118 formed in the adjacent side frame rail 12 (FIGS. 2—5). A bar 120, such as an ordinary pry bar, may be inserted slidably into either of said tubes, as shown, so as to project upwardly and outwardly from the dolly. An operator may then push on said bar, preferably with sudden, jerking movements, to cause angular sliding or skidding of wheels 14 on the ground, thereby to steer or change the direction of travel of the dolly. This mode of steering, though extremely simple, has been found to be fully practical and effective, even when the dolly is heavily loaded.

A ring 122, by means of which the dolly may be towed, is provided at both the front and rear of the dolly. Each ring, being generally horizontally disposed, extends through a slot 124 formed in the associated front or rear frame rail, and encircles a vertical pin 126 fixed in said rail. As best shown at the rearward end of the dolly in FIG. 8, each ring may be extended outwardly from the dolly, as shown in solid lines, for easy attachment of a towing rope or cable, or may be pushed inwardly into the dolly, as shown in dotted lines, to get it out of the way when not in use.

As thus far described, the top surface of the dolly platform 2 is horizontal and smooth, there being no projections of any sort thereabove. This is an advantageous situation with many types of loads, since it imposes no limitations on the horizontal dimensions of the load, which may in fact extend outwardly from the platform in all directions. Also, the fact that the platform is quite low is generally advantageous, since heavy loads may be placed thereon or removed with less difficulty than would occur if the platform were higher. However, if a very long load, such as a telephone pole or the like, is to be carried, the low elevation of the platform may create problems, since the pole extends beyond the platform perhaps 20 or 30 feet in both directions, and its ends may sag or droop to the ground to interfere with movement of the dolly. Accordingly, the present dolly is equipped with an upright standard 128 rising from the center thereof, with a cradle 130 at its upper end. Standard 128 includes a lower tubular portion 132 fixed at its lower end to a square base plate 134 adapted to rest on platform 2. At each of a pair of diametrically opposite corners, base plate 134 has affixed therein a depending pin 136 adapted to engage in a hole 138 formed in platform plate 4 whereby to position plate 134 accurately. At each of the other pair of diametrically opposite corners of plate 134, (see FIGS. 6 and 7), a hole 140 formed therein matches with a hole 142 formed in plate 4, and screw 144 having an enlarged head 146 and handle 148 at its upper end is extended downwardly through holes 140 and 142 and is threaded into a nut 150 welded to the lower surface of plate 4. Thus the standard is securely mounted, but can easily be removed by removing screws 144, leaving the top of the platform smooth and free of obstructions. Standard 128 also includes a cylindrical upper portion 152 telescoped slidably in lower portion 132 and supported rotatably therein by a suitable thrust bearing 154 (see FIG. 1). Cradle 130 is semicylindrical for supporting a telephone pole 156 or the like, and is affixed to the upper end of standard section 152. Rotation of the cradle on bearing 154 is normally prevented by a pin 158 inserted diametrically through holes 160 formed in lower standard section 132, and matching holes 162 formed in upper standard section 152. Upper standard section 152 is also provided with another set of holes 164, offset 90° from holes 162, so that when pin 158 is removed, the cradle can be turned 90° and pin 158 reinserted to engage holes 160 and 164. Thus telephone pole 156 can be set to extend either from front to rear of the dolly, or from side to side, as may be desirable in any given set of circumstances, and fixed in that position. A chain 166 extends diametrically through standard section 152 just below cradle 130, holes 168 being provided in the standard for this purpose. Said chain is then wrapped about the exterior of the cradle and over the top of the telephone pole, and its ends brought together and secured by any suitable chain tightener 170 operable to draw the chain tight, whereby the telephone pole, or any other load, is held firmly in the cradle.

It is considered that the operation of the dolly has been fully described in connection with the above description of its construction.

While I have shown and described a specific embodiment of my invention, it will be readily apparent that many minor changes of structure and operation could be made without departing from the spirit of the invention.

I claim:

1. A dolly comprising:
  a. a platform having a planar horizontal top surface,
  b. ground-engaging wheels carried rotatably by said platform and disposed entirely therebeneath,
  c. an electric motor carried by said platform, disposed entirely beneath the top surface thereon, and having a driving connection with said wheels, said driving connection between said motor and said wheels including a rotatable shaft common to the drive of all of said wheels,
  d. brake means operable to inhibit the rotation of said wheels, said brake means including means operable to inhibit directly the rotation of said shaft, whereby to affect the rotation of all of said wheels equally, and
  e. means for operating said means including a foot-operated pedal disposed adjacent but entirely below the level of the top surface of said platform.

2. A dolly comprising:
  a. a platform having a planar horizontal top surface,
  b. a pair of ground-engaging wheels carried rotatably by said platform and disposed entirely therebeneath, said wheels being disposed respectively adjacent the front and rear ends of said platform, and being of such length parallel to their axes as to extend nearly the entire width of said platform,
  c. an electric motor carried by said platform, disposed entirely beneath the top surface thereof and operable to drive said wheels, and
  d. steering means comprising a pair of socket members carried by said platform respectively at opposite sides thereof and opening laterally therefrom beneath the level of the top surface thereof, and a bar adapted to be inserted slidably into either of said socket members so as to project laterally from said platform, whereby manual pressure on said bar will steer the dolly by causing angular sliding or skidding of said wheels relative to the ground.

3. A dolly comprising:
  a. a platform having a planar horizontal top surface,
  b. ground-engaging wheels carried rotatably by said platform and disposed entirely therebeneath,
  c. an electric motor carried by said platform, disposed entirely beneath the top surface thereof and operable to drive said wheels,
  d. an upright standard having its lower end secured releasably to said platform, and
  e. an upwardly opening, generally semicylindrical cradle affixed to the upper end of said standard.

4. A dolly as recited in claim 3 wherein said standard includes upper and lower sections which are relatively rotatable about a vertical axis, and with the addition of means operable to secure said standard sections releasably at any of a plurality of relative angular positions.

5. A dolly as recited in claim 3 with the addition of a chain extending slidably through said standard just below said cradle and adapted to be wrapped about said cradle and any load supported therein, and means joining the ends of said chain and operable to tighten said chain about said cradle and said load.